United States Patent
Dorum

(10) Patent No.: US 10,397,089 B2
(45) Date of Patent: Aug. 27, 2019

(54) METHOD AND APPARATUS FOR USING VIRTUAL PROBE POINTS FOR ROUTING OR NAVIGATION PURPOSES

(71) Applicant: HERE Global B.V., Eindhoven (NL)

(72) Inventor: Ole Henry Dorum, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 189 days.

(21) Appl. No.: 15/228,226

(22) Filed: Aug. 4, 2016

(65) Prior Publication Data

US 2018/0041416 A1 Feb. 8, 2018

(51) Int. Cl.
*G06F 15/173* (2006.01)
*H04L 12/26* (2006.01)
(Continued)

(52) U.S. Cl.
CPC .............. *H04L 43/12* (2013.01); *G01C 21/00* (2013.01); *G01S 5/0018* (2013.01); *G08G 1/0112* (2013.01); *G08G 1/0133* (2013.01); *G08G 1/0141* (2013.01); *G08G 1/0175* (2013.01); *G08G 1/052* (2013.01); *G08G 1/056* (2013.01); *H04L 12/4641* (2013.01); *H04L 45/02* (2013.01); *H04L 67/12* (2013.01);
(Continued)

(58) Field of Classification Search
CPC ............................ G08G 1/0112; G08G 1/0175
See application file for complete search history.

(56) References Cited

U.S. PATENT DOCUMENTS

| 2009/0259401 A1* | 10/2009 | Edwards | G01S 7/062 |
| | | | 701/301 |
| 2012/0162432 A1* | 6/2012 | Abl | G08G 1/0175 |
| | | | 348/149 |

(Continued)

FOREIGN PATENT DOCUMENTS

| CN | 104 616 502 A | 5/2015 |
| EP | 2 887 333 A1 | 6/2015 |

(Continued)

OTHER PUBLICATIONS

Harris, Mark; "The AI Dashcam App That Wants to Rate Every Driver in the World"; Downloaded from the Internet Nov. 5, 2016; Downloaded at: <http://spectrum.ieee.org/cars-that-think/transportation/sensors/the-ai-dashcam-app-that-wants-to-rate-every-driver-in-the-world>.

(Continued)

*Primary Examiner* — Kyung H Shin
(74) *Attorney, Agent, or Firm* — Alston & Bird LLP

(57) ABSTRACT

A method, apparatus and computer program product utilize virtual probe points, such as in combination with traditional probe points, for various routing and navigation purposes. In the context of a method, virtual probe data is received from a plurality of sources. The virtual probe data includes a plurality of virtual probe points at different respective locations. For a virtual probe point, the virtual probe data includes a hashed identifier of a vehicle and a location of the vehicle. The hashed identifiers of the virtual probe data that is received have been subjected to the same hash function by each of the plurality of sources. The method also includes updating a probe data repository with the virtual probe data including the plurality of virtual probe points and the hashed identifiers associated therewith.

29 Claims, 6 Drawing Sheets

(51) Int. Cl.

| | |
|---|---|
| *H04L 12/46* | (2006.01) |
| *H04L 12/751* | (2013.01) |
| *H04L 29/08* | (2006.01) |
| *G01C 21/00* | (2006.01) |
| *G01S 5/00* | (2006.01) |
| *G08G 1/01* | (2006.01) |
| *G08G 1/017* | (2006.01) |
| *G08G 1/052* | (2006.01) |
| *G08G 1/056* | (2006.01) |
| *G01S 7/06* | (2006.01) |
| *G06F 21/64* | (2013.01) |
| *G09C 1/00* | (2006.01) |

(52) U.S. Cl.
CPC ............. *H04L 67/18* (2013.01); *G01S 7/062* (2013.01); *G06F 21/64* (2013.01); *G09C 1/00* (2013.01)

(56) References Cited

U.S. PATENT DOCUMENTS

| | | | |
|---|---|---|---|
| 2016/0097648 A1 | 4/2016 | Hannah | |
| 2017/0069200 A1* | 3/2017 | Masutani | ............. G08G 1/0112 |

FOREIGN PATENT DOCUMENTS

| | | |
|---|---|---|
| JP | 2000 259982 A | 9/2000 |
| JP | 2005-178531 A | 7/2005 |
| JP | 2006-176293 A | 7/2006 |
| KR | 10-0472080 B1 | 3/2005 |
| KR | 10-0990404 B1 | 10/2010 |
| KR | 2013-0110821 A | 10/2013 |
| RU | 2 580 332 C1 | 4/2016 |
| WO | WO 2006/020337 A2 | 2/2006 |

OTHER PUBLICATIONS

Rahmani, Mahmood et al.; "Floating Car and Camera Data Fusion for Non-Parametric Route Travel Time Estimation"; 2014 IEEE 17th International Conference on Intelligent Transportation Systems (ITSC); Oct. 8-11, 2014; Qingdao, China; pp. 1286-1291.

Vehicle Sensor Data Cloud Ingestion Interface Specification, version 2.0.2 by HERE Global B.V. (2015); Downloaded from the Internet at: <https://lts.cms.here.com/static-cloud-content/Company_Site/2015_06/Vehicle_Sensor_Data_Cloud_Ingestion_Interface_Specification.pdf>.

International Search Report and Written Opinion for Application No. PCT/EP2017/069724 dated Nov. 9, 2017 16 pages total.

Lee, U. et al., *MobEyes: Smart Mobs for Urban Monitoring With Vehicular Sensor Networks*, IEEE Wireless Communications (2006) 15 pages.

* cited by examiner

METHOD AND APPARATUS FOR USING VIRTUAL PROBE POINTS FOR ROUTING OR NAVIGATION PURPOSES

TECHNOLOGICAL FIELD

An example embodiment is directed to the capture and analysis of virtual probe data including a plurality of virtual probe points and, more particularly, to the use of the virtual probe points for routing or navigation purposes.

BACKGROUND

Routing and navigation systems sometimes rely upon probe data consisting of a plurality of probe points. In this regard, probe points are representative of travel along a road. The probe points may be collected by a variety of different data collection devices, such as a global positioning system (GPS), navigation systems, location tracking systems or the like. These data collection devices may be carried by vehicles, for example, as the vehicles travel along the roads. For example, the data collection devices may be mounted within the vehicles, such as a component of a navigation system, an advanced driver assistance system (ADAS) or the like, or may be carried by passengers within the vehicle, such as in an instance in which the data collection device is embodied by a mobile terminal, tablet computer or other portable computing device carried by the passenger riding within the vehicle. The data collection devices repeatedly capture probe points as the data collection devices move along a respective road, such as by capturing probe points at a predefined frequency. Each probe point defines a location at which the probe point was captured, such as in terms of latitude and longitude. The probe point may also include or otherwise be associated with a variety of other information including, for example, the speed of the vehicle, the time at which the probe point was captured, the heading of the vehicle, etc.

Based upon an analysis of probe points, a routing or navigation system can identify instances in which a road has changed course and/or in which a new road has been constructed. Further, based upon the probe points, a routing and navigation system may estimate travel time along a route from an origin to a destination. In this regard, a routing and navigation system may determine the time expended for vehicles represented by probe points to travel the same route or at least a portion of the route and, based on this information, estimate the travel time along the route during a corresponding time period.

In instances in which the number of probe points along a respective road is relatively few, however, the use of the probe points by a routing and navigation system may produce results that are less accurate than are desired. For example, with only a few probe points along a road, the travel time that is estimated for a route that includes travel along the road may be less accurate than is desired since the relatively few probe points may not accurately represent the travel time incurred by other vehicles. This challenge relating to the reliance upon probe points by routing and navigation systems in instances in which only a relatively few probe points are identified along a road is particularly notable on roads that are less well traveled including, for example, many roads within a residential neighborhood.

Further, since not all vehicles and, in some instances, only a small percentage of all vehicles on a road provide probe points, the penetration rate, that is, the fraction of vehicles that provide probe points relative to the total number of all vehicles on a road, is generally relatively low. Consequently, routing and navigation systems may find it difficult to estimate traffic flow from the probe data. In this regard, the probe data that is collected may not allow the actual traffic density, that is, the actual number of vehicles on the road over a particular length of the road, to be determined since the vehicles that provide probe points are less than all of the vehicles on the road and the total number of vehicles on the road is correspondingly unknown. Thus, while estimates of traffic flow would be useful for routing and navigation systems and, in turn, the subscribers of routing and navigation systems, traffic flow has not generally been able to be reliably estimated based upon probe data.

BRIEF SUMMARY

A method, apparatus and computer program product are provided in accordance with an example embodiment in order to utilize virtual probe points, such as in combination with traditional probe points, for various routing and navigation purposes. By supplementing the traditional probe data with virtual probe data that includes a plurality of virtual probe points, a larger number of probe points may be collected and a greater penetration rate may be obtained. Thus, routing and navigation systems may utilize the virtual probe data to estimate traffic conditions more precisely and to detect changes in a road including the construction of a new road, even in instances in which the road is less traveled as a result of the increase in the number of relevant probe points brought about by the reliance on virtual probe points. Further, the increased penetration rate brought about by the reliance upon virtual probe points may permit traffic flow to be estimated as a combination of traditional probe points and virtual probe points may include all or a substantial fraction of the vehicles travelling along a road so as to permit the traffic density and the traffic flow along the road to be more reliably estimated.

In an example embodiment, a navigation system is provided that includes a communication interface configured to receive virtual probe data from a plurality of sources. The virtual probe data includes a plurality of virtual probe points at different respective locations. For a virtual probe point, the virtual probe data includes a hashed identifier of a vehicle and a location of the vehicle. The hashed identifiers of the virtual probe data that is received have been subjected to a same hash function by each of the plurality of sources. The navigation system also includes at least one processor configured to analyze the hashed identifiers of the virtual probe points provided by different sources to identify a same vehicle at different locations at different times and, based on identification of the same vehicle at different locations at different times, to estimate traffic conditions. The navigation system of an example embodiment also includes a probe data repository configured to store the virtual probe data including the plurality of virtual probe points and the hashed identifiers associated therewith.

In an example embodiment, a method is provided that includes receiving virtual probe data from a plurality of sources. The virtual probe data includes a plurality of virtual probe points at different respective locations. For a virtual probe point, the virtual probe data includes a hashed identifier of a vehicle and a location of the vehicle. The hashed identifiers of the virtual probe data that is received have been subjected to the same hash function, such as a one-way hash function, by each of the plurality of sources. The method also includes updating a probe data repository with the virtual probe data including the plurality of virtual probe points and the hashed identifiers associated therewith.

The method of an example embodiment also includes analyzing the hashed identifiers of the virtual probe points provided by different sources to identify the same vehicle at different locations at different times. Based on the identification of the same vehicle at different locations at different times, the method also includes estimating traffic conditions. The method of an example embodiment estimates the traffic conditions by determining a most likely route between different locations and then either estimating a distance traveled by the vehicle along the most likely route between the different locations and/or determining an average speed of the vehicle along the most likely route between the different locations. The virtual probe data of an example embodiment also includes a speed of the vehicle, a heading of the vehicle and/or a time at which the virtual probe data for the vehicle was collected.

The method of an example embodiment detects a change in a road based at least in part upon the virtual probe data having a location associated with the road. Additionally or alternatively, the method estimates traffic conditions at a location based at least in part upon the virtual probe data associated with the location. The virtual probe data that is received may include a speed and/or a heading of the vehicle. In this regard, the speed of the vehicle may be determined to be either 1) a speed of the source corresponding to the virtual data point, or 2) a speed calculated by the source corresponding to the virtual data point with the speed calculated by the source including a speed offset based on a relative speed of the vehicle to the source corresponding to the virtual data point. In an example embodiment, the location of the vehicle is determined to be either 1) a location of the source corresponding to the virtual data point, or 2) a location calculated by the source corresponding to the virtual data point with the location calculated by the source including a location offset based on a relative location of the vehicle to the source corresponding to the virtual data point. In an example embodiment, the hashed identifier includes a hashed representation of license plate information of the vehicle.

In another example embodiment, an apparatus is provided that includes at least one processor and at least one memory including computer program instructions with the at least one memory and the computer program instructions, with the at least one processor, causing the apparatus at least to receive virtual probe data from a plurality of sources. The virtual probe data includes a plurality of virtual probe points at different respective locations. For a virtual probe point, the virtual probe data includes a hashed identifier of a vehicle and the location of the vehicle. The hashed identifiers of the virtual probe data that is received have been subjected to the same hash function, such as a one-way hash function, by each of the plurality of sources. The at least one memory and the computer program instructions are also configured to, with the at least one processor, cause the apparatus to update a probe data repository with the virtual probe data including the plurality of virtual probe points and the hashed identifiers associated therewith.

The at least one memory and the computer program instructions are also configured to, with the at least one processor, cause the apparatus of an example embodiment to analyze the hashed identifiers of the virtual probe points provided by different sources to identify the same vehicle at different locations at different times. The at least one memory and the computer programs instructions are further configured, with the at least one processor, to cause the apparatus of this embodiment to estimate traffic conditions based on the identification of the same vehicle at different locations at different times.

The at least one memory and the computer program instructions are configured, with the at least one processor, to cause the apparatus of an example embodiment to detect a change in a road based at least in part upon the virtual probe data having a location associated with the road. Additionally or alternatively, the at least one memory and the computer program instructions are configured, with the at least one processor, to cause the apparatus of an example embodiment to estimate traffic conditions at a location based at least in part upon the virtual probe data associated with the location. The virtual probe data that is received may include a speed and/or a heading of the vehicle. The hashed identifier of an example embodiment includes a hashed representation of license plate information of the vehicle.

In a further example embodiment, a computer program product is provided that includes at least one non-transitory computer-readable storage medium having computer-executable program code portions stored therein with the computer-executable program code portions including program code instructions configured to receive virtual probe data from a plurality of sources. The virtual probe data includes a plurality of virtual probe points at different respective locations. For a virtual probe point, the virtual probe data includes a hashed identifier of a vehicle and a location of the vehicle. The hashed identifiers of the virtual probe data that is received have been subjected to the same hash function by each of the plurality of sources. The computer-executable program codes portions also include program code instructions configured to update a probe data repository with the virtual probe data including the plurality of virtual probe points and the hashed identifiers associated therewith.

In yet another example embodiment, an apparatus is provided that includes means for receiving virtual probe data from a plurality of sources. The virtual probe data includes a plurality of virtual probe points at different respective locations. For a virtual probe point, the virtual probe data includes a hashed identifier of the vehicle and the location of the vehicle. The hashed identifiers of the virtual probe data that has received have been subjected to the same hash function by each of the plurality of sources. The apparatus of this example embodiment also includes means for updating a probe data repository with the virtual probe data including the plurality of virtual probe points and the hashed identifiers associated therewith.

In an example embodiment, an apparatus is provided that includes at least one processor and at least one memory including computer program instructions with the at least one memory and the computer program instruction, with the at least one processor, causing the apparatus to at least receive an image captured by a camera of an identifier of a vehicle, such as the license plate information of the vehicle. The camera is carried by a platform different than the vehicle. The at least one memory and the computer program instructions are configured, with the at least one processor, to also cause the apparatus to subject the identifier of the vehicle to a hash function to create a hashed identifier and to determine a location of the vehicle. The at least one memory and the computer program instructions, with the at least one processor, further cause the apparatus to cause virtual probe data comprising the hash identifier, the location and the speed to be transmitted for subsequent analysis.

The at least one memory and the computer program instructions are further configured, with the at least one processor, to cause the apparatus of an example embodiment to determine a speed of the vehicle. In this embodiment, the virtual probe data further includes the speed. In this example embodiment, the at least one memory and the computer program instructions are configured, with the at least one processor, to cause the apparatus to determine the speed of the vehicle either by 1) determining a speed of the platform, or 2) calculating the speed by including a speed offset based on a relative speed of the vehicle to the platform. The at least one memory and the computer program instructions are configured, with the at least one processor, to cause the apparatus of an example embodiment to determine the location of the vehicle either by 1) a location of the platform, or 2) calculating the location including a location offset based on a relative location of the vehicle to the platform.

The at least one memory and the computer program instructions are further configured, with the at least one processor, to cause the apparatus of an example embodiment to determine a heading of the vehicle. In this example embodiment, the virtual probe data also includes the heading. The at least one memory and the computer program instructions are further configured, with the at least one processor, to cause the apparatus of an example embodiment to receive images captured by the camera of the identifiers of a plurality of vehicles and to subject the identifiers of the plurality of vehicles to the same hash function to create a plurality of hashed identifiers. The images captured by the camera may include the identifiers of vehicles traveling in both the same and a different direction as the platform upon which the camera is carried. In an example embodiment, the platform includes the vehicle and the camera is configured to capture images for one or more safety features of the vehicle.

In another example embodiment, a method is provided that includes receiving an image captured by a camera of an identifier of a vehicle. The camera is carried by a platform different than the vehicle. The method also includes subjecting the identifier of the vehicle to a hash function to create a hashed identifier and determining the location of the vehicle. The method further includes causing virtual probe data including the hashed identifier and the location and the speed to be transmitted for subsequent analysis.

In a further example embodiment, a computer program product is provided that includes at least one non-transitory computer-readable storage medium having computer-executable program code portions stored therein with the computer-executable program code portions including program code instructions configured to receive an image captured by a camera of an identifier of the vehicle. The camera is carried by a platform different than the vehicle. The computer-executable program code portions also include program code instructions configured to subject the identifier of the vehicle to a hash function to create a hashed identifier and program code instructions configured to determine the location of the vehicle. The computer-executable program code portions further include program code instructions configured to cause virtual probe data including the hashed identifier, the location and the speed to be transmitted for subsequent analysis.

In yet another example embodiment, an apparatus is provided that includes means for receiving an image captured by a camera of an identifier of a vehicle. The camera is carried by a platform different than the vehicle. The apparatus of this example embodiment also includes means for subjecting the identifier of the vehicle to a hash function to create a hashed identifier and means for determining the location of the vehicle. The apparatus further includes means for causing virtual probe data including the hashed identifier, the location and the speed to be transmitted for subsequent analysis.

BRIEF DESCRIPTION OF THE DRAWINGS

Figure 1:
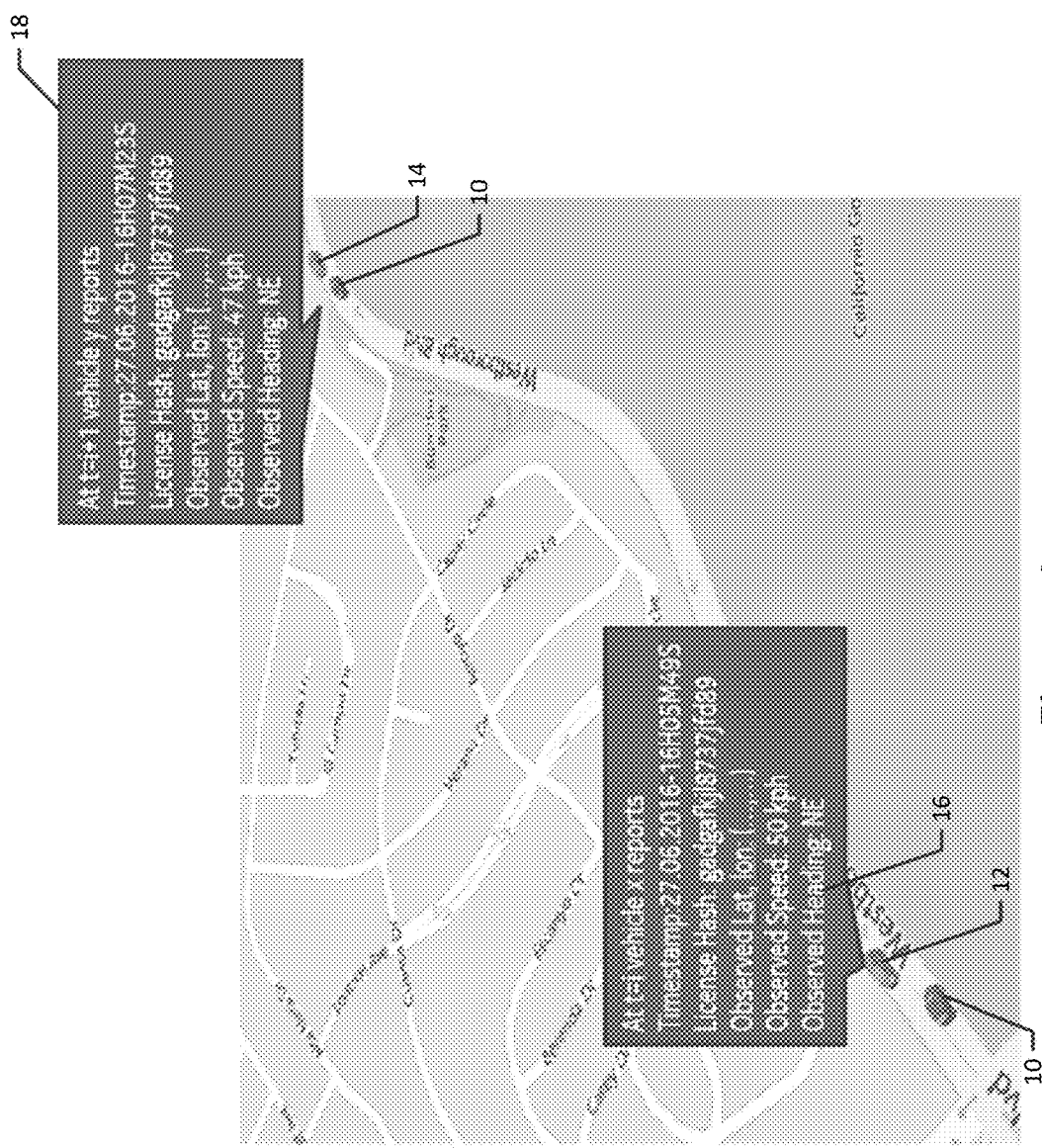
Figure 2:
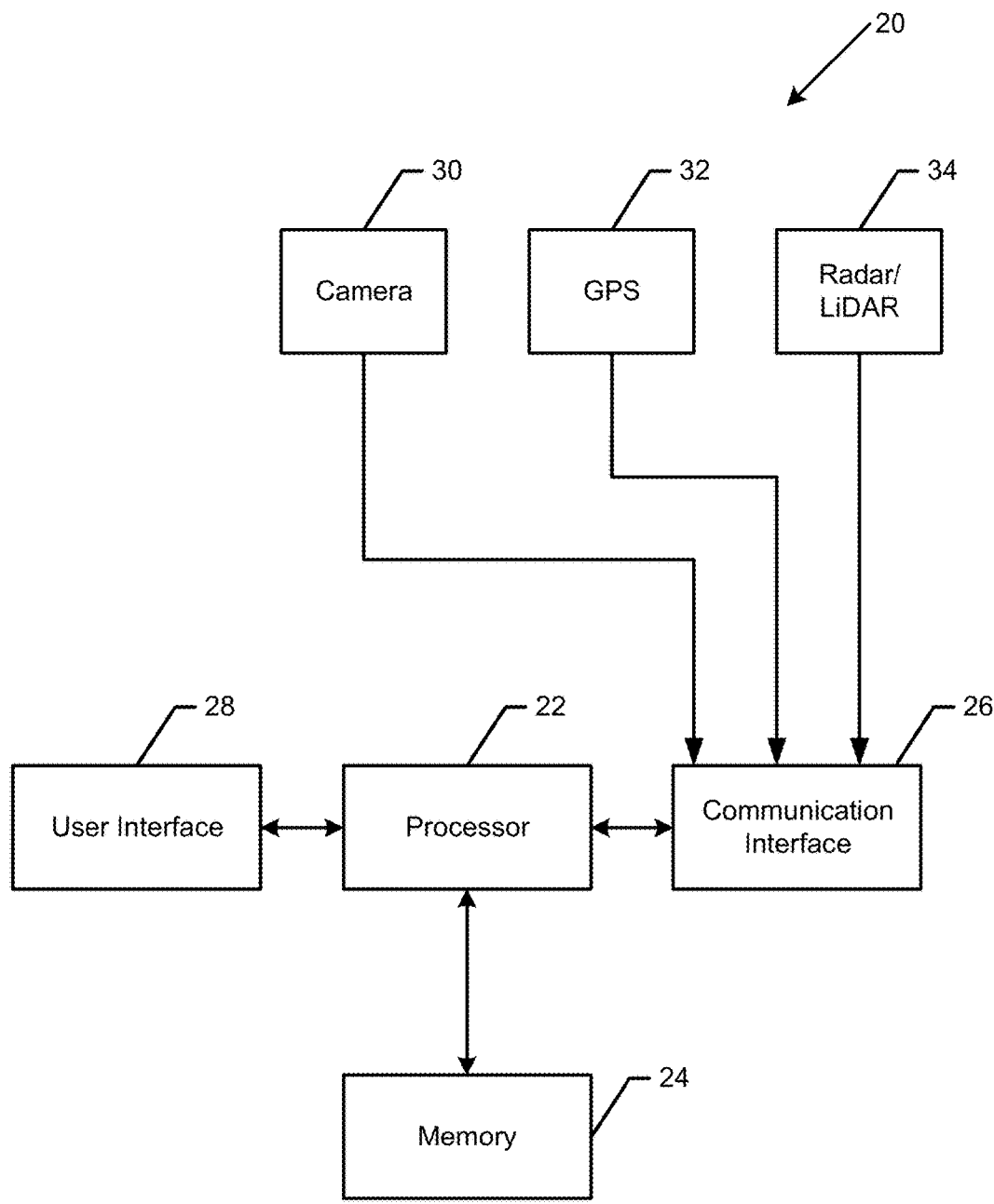
Figure 3:
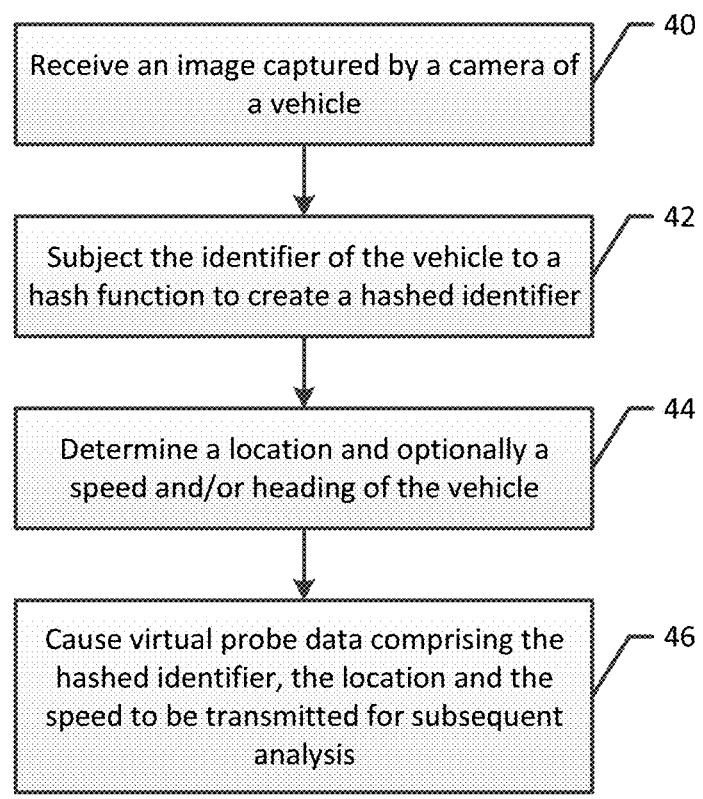
Figure 4:
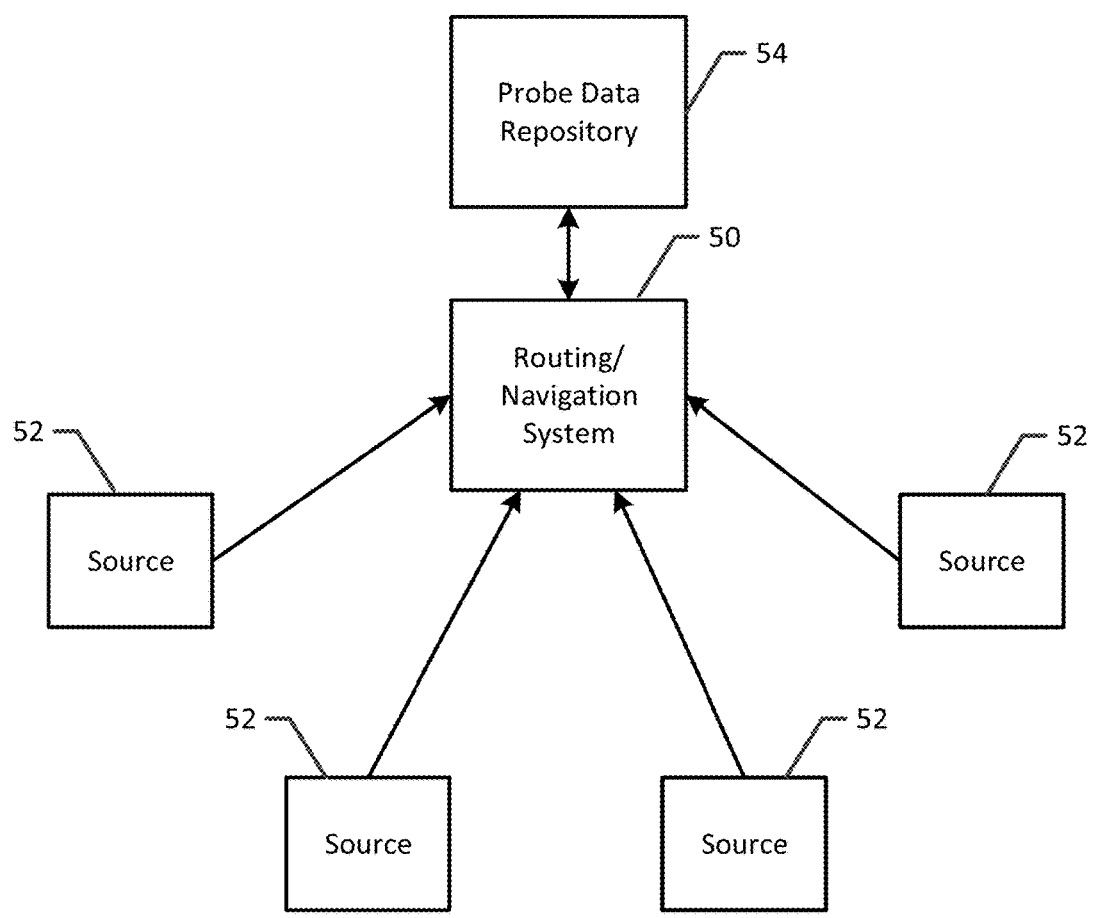
Figure 5:
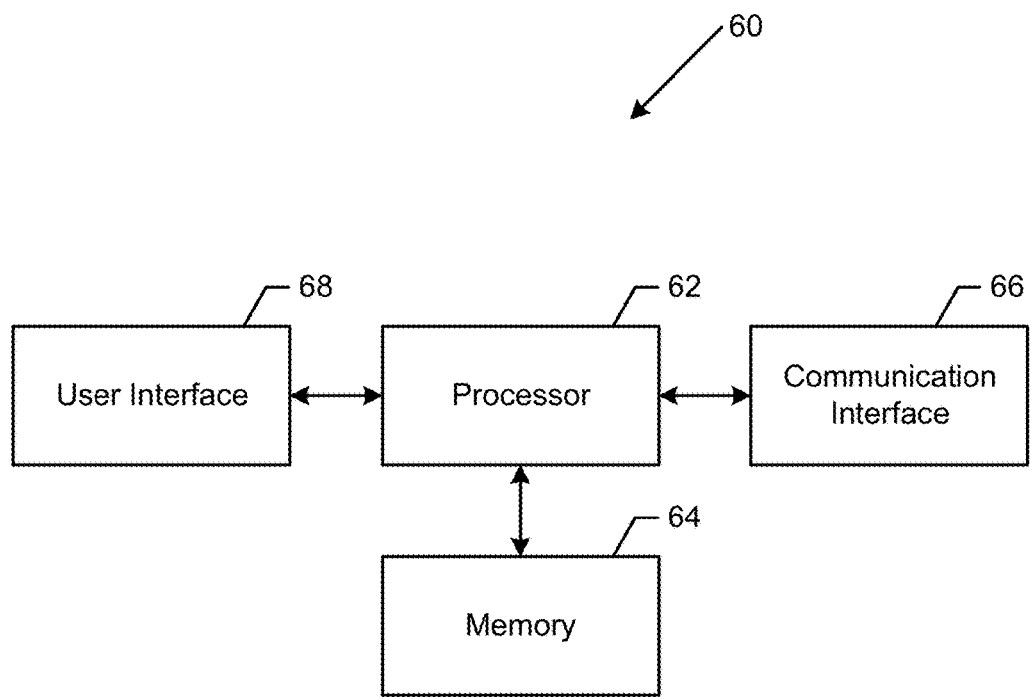
Figure 6:
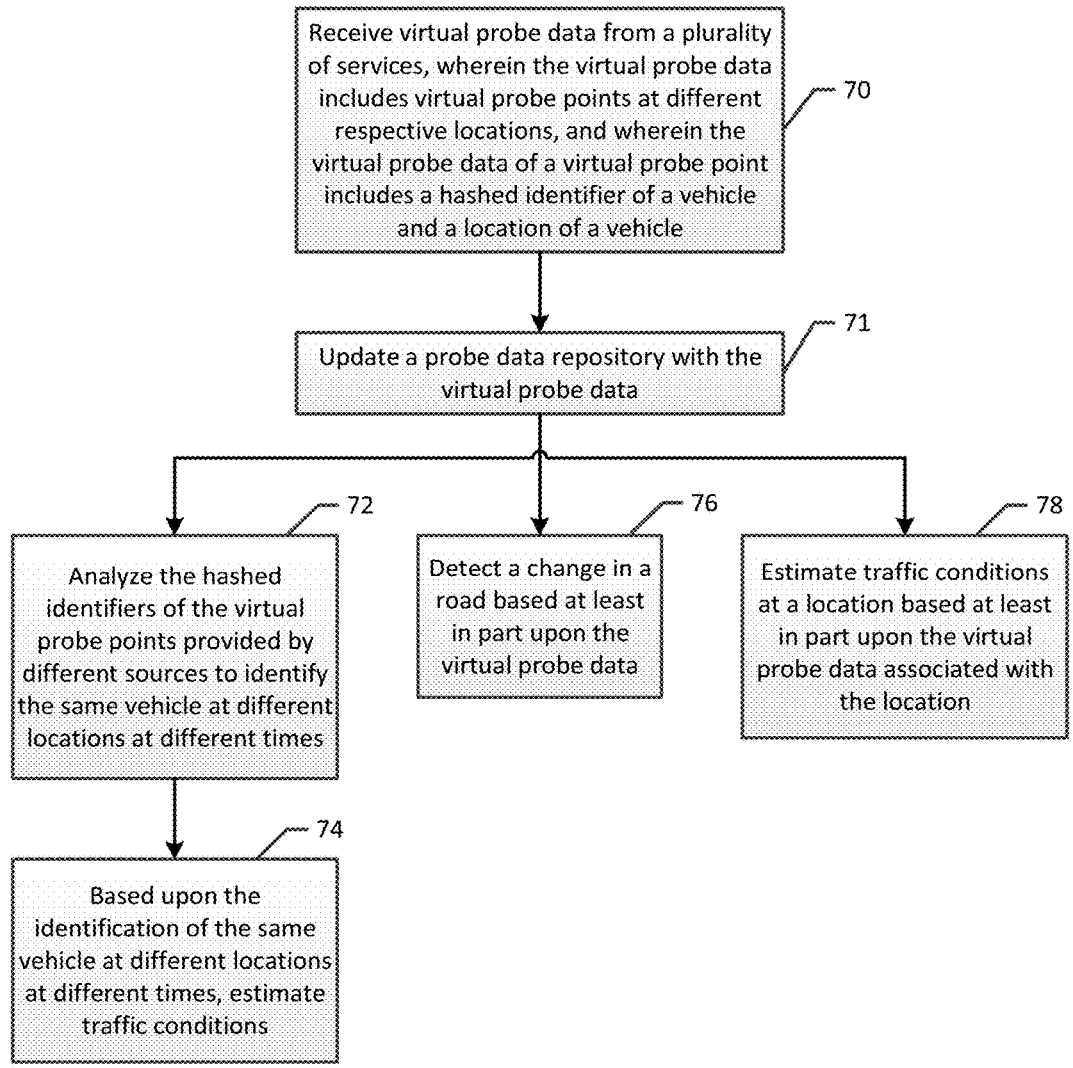

Having thus described certain example embodiments of the present disclosure in general terms, reference will hereinafter be made to the accompanying drawings, which are not necessarily drawn to scale, and wherein:

FIG. 1 is a representation of a map in which a virtual probe point is captured of the same vehicle at two different locations at two different times in accordance with an example embodiment of the present invention;

FIG. 2 is a block diagram of an apparatus configured in accordance with an example embodiment of the present invention in order to capture virtual probe data;

FIG. 3 is a flowchart of operations performed, such as by the apparatus of FIG. 2, in order to capture virtual probe data in accordance with an example embodiment of the present invention;

FIG. 4 is a block diagram of a system in which virtual probe data captured by a plurality of sources is provided to a routing and navigation system in accordance with an example embodiment of the present invention;

FIG. 5 is a block diagram of an apparatus configured to estimate traffic conditions or detect a change in a road based upon virtual probe data in accordance with an example embodiment of the present invention; and FIG. 6 is a flowchart illustrating operations performed, such as by the apparatus of FIG. 5, in order to estimate traffic conditions or detect a change in a road based upon virtual probe data in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to capture virtual probe data and then to rely upon the virtual probe data in order to perform various routing and/or navigation functions, such as to estimate traffic conditions or to detect a change in a road. The virtual probe data includes a plurality of virtual probe points. Virtual probe points are representative of travel of a vehicle along a road and, as such, each virtual probe point defines a location at which the virtual probe point was captured and optionally other information related to the vehicle that is the subject of the virtual probe point at the time that the virtual probe point was captured as described below. Unlike traditional probe points that are captured by data collection devices carried by the vehicles that are the subject of the probe points, the information regarding the vehicle associated with a virtual probe point, e.g., location, time, etc., is not collected and provided by a data collection device carried by the vehicle that is the subject of the virtual probe point. Instead, a virtual probe point is captured and provided by a data collection device onboard and carried by another vehicle that is generally proximate to or at least sufficiently near the vehicle that is the subject of the virtual probe point such that the vehicle that is the subject of the virtual probe point is visible from the vehicle carrying the data collection device. In some example embodiments, the data collection device that is onboard and carried by another vehicle may not only collect information regarding the vehicle that is the subject of the virtual probe point in order to capture and provide a virtual probe point as described herein, but may also collect information, e.g., location, time, etc., regarding the vehicle that carries the data collection device in order to also capture and provide traditional probe points representative of the travel of the vehicle that carries the data collection device.

By way of example, FIG. 1 depicts a map with vehicles travelling along Westborough Boulevard. As shown, vehicle 10 is proceeding in a northeasterly direction along Westborough Boulevard and the location of vehicle 10 is shown at two different instances in time designated time t=i and time t=i+1. Proceeding in the opposite direction, that is, in a southwesterly direction, along Westborough Boulevard, vehicle 12 and vehicle 14 are proximate vehicle 10 at the different instances in time. In accordance with an example embodiment and as described below, vehicle 12 may carry a data collection device configured to capture the data elements of a virtual probe point representative of the travel of vehicle 10 along Westborough Boulevard at time t=i. Similarly, vehicle 14 may carry a data collection device that is configured to capture the data elements that comprise the virtual probe point representative of the travel of vehicle 10 along Westborough Boulevard at time t=i+1. The data collection devices carried by, e.g., onboard, vehicles 12 and 14 may be then be configured to provide the virtual probe points to a computing system, such as a routing and navigation system, for analysis as described below. In an example embodiment, the data collection devices of vehicles 12 and 14 may not only capture virtual probe points, but may also capture traditional probe points (including, for example, location, time, speed, etc.) representative of the travel of the respective vehicle that carries the data collection device along Westborough Boulevard.

Each virtual probe point may include a plurality of data elements that identify vehicle 10 and that define various parameters associated with the operation of vehicle 10 at the point in time at which the virtual probe point was captured. As shown in FIG. 1, for example, the virtual probe points captured by the data collection devices onboard vehicles 12 and 14 are designated as 16 and 18, respectively, and may include the time at which the virtual probe point was captured, such as represented by a time stamp identifying the date and time at which the data elements were captured. Additionally, the vehicle associated with the virtual probe point, e.g., vehicle 10, may be identified based upon a unique vehicular identifier, such as license plate information of the vehicle and, more particularly, a hashed representation of the license plate information. The virtual probe point may also include the location of the vehicle, such as in terms of a latitude and a longitude, the speed of the vehicle and/or the heading of the vehicle.

The data collection device carried by a platform, e.g., vehicle 12 or 14, different than the vehicle with which the virtual probe point is associated, such as vehicle 10 in the example of FIG. 1, may include or otherwise be associated with an apparatus configured to capture and provide the virtual probe point. The apparatus embodied by the data collection device may be configured in various manners. For example, the apparatus may be embodied by any of a variety of different computing devices, such as a GPS, a navigation system, a location tracking system or the like. In this regard, the data collection device embodying the apparatus configured to capture and provide virtual probe points may be mounted within a vehicle, e.g., vehicle 12 or 14, such as a component of a navigation system, an ADAS or the like, or may be carried by passengers within the vehicle, such as in an instance in which the data collection device that embodies the apparatus is, in turn, embodied by a mobile terminal, tablet computer or other portable computing device carried by the passenger riding within the vehicle, different than the vehicle, e.g., vehicle 10, that is the subject of the virtual probe point.

Although the apparatus configured to capture and provide virtual probe points may be configured in various manners, the apparatus 20 of an example embodiment is depicted in FIG. 2. As shown, the apparatus of this example embodiment includes, is associated with or otherwise be in communication with, a processor 22, a memory device 14, a communication interface 26 and optionally a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor, such as historical probe points. Additionally or alternatively, the memory device could be configured to store instructions for execution by the processor.

As noted above, the apparatus 20 may be embodied by a computing device including those described above. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment also includes a communication interface 26 that may be any means such as a device or circuitry embodied in either hardware or a combination of hardware and software that is configured to receive and/or transmit data from/to other electronic devices in communication with the apparatus, such as by being configured to receive data from various sensors, such as a camera 30, a GPS 32 and/or a radar or a light detection and ranging (LiDAR) system 34, and to provide probe data including virtual probe data to a routing and navigation system and/or to a database, cloud storage or other external memory device. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 2, the apparatus 20 may also optionally include or otherwise be in communication with a user interface 28. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 22 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24 and/or the like).

Referring now to FIG. 3, the operations performed by the apparatus 20 of FIG. 2 in order to capture virtual probe points associated with a different vehicle than the platform, e.g., the vehicle, that carries the apparatus are depicted. As shown in block 40 of FIG. 3, the apparatus includes means, such as the processor 22, the communication interface 26 or the like, for receiving an image captured by a camera 30. Like the apparatus, the camera is generally carried by a platform, such as a vehicle, different than the vehicle with which the virtual probe point is to be associated. The image includes an identifier of the vehicle, e.g., vehicle 10, with which the virtual probe point is to be associated. Although different identifiers of the vehicle may be relied upon to uniquely identify the respective vehicle that is the subject of the virtual probe point, the license plate information of the vehicle may serve as the identifier of the vehicle. As such, the camera of this example embodiment is configured to capture an image that includes the license plate information of the vehicle. As described herein, the license plate information may include the license plate number and, in some embodiments, other information, such as the jurisdiction, e.g., the state, the country, etc., that issued the license plate in order to permit license plates having the same license plate number that are issued by different jurisdictions to be distinguished.

Although the camera 30 may be dedicated to capturing an image that includes the identifier of the vehicle that is the subject of the virtual probe point, such as a license plate number of the vehicle, the camera of an example embodiment in which the apparatus 20 configured to capture and provide virtual probe data is carried by a vehicle, albeit a different vehicle than the vehicle with which the virtual probe point is associated, the camera may also be configured to capture images for one or more safety features of the vehicle. For example, the camera may also be configured to capture images utilized in conjunction with the provision of lane departure warnings, collision warnings, etc.

As shown in block 42, the apparatus 20 also includes means, such as the processor 22 or the like, for subjecting the identifier of the vehicle that is the subject of the virtual probe point to a hash function to create a hashed identifier. Although the apparatus, such as the processor, may utilize various hash functions, the apparatus, such as the processor, of an example embodiment is configured to utilize a one-way hash function. By hashing the identifier, such as the license plate information, of the vehicle, the anonymity of the vehicle, such as vehicle 10 in the example of FIG. 1, with which the virtual probe point is to be associated is maintained. However, the hashed identifier permits the vehicle that is the subject of the virtual probe point to be uniquely identified, while still preserving its anonymity. For example, a one-way hash function, such as secure hash algorithm 1 (SHA-1), transforms the identifier of the vehicle, such as the license plate information, into a unique binary number that serves as a virtual anonymous probe identifier that cannot be inverted to recreate the original identifier of the vehicle, such as the license plate information of the vehicle.

By way of example in which the license plate information includes both the license plate number and the jurisdiction and, more particularly includes a license plate number of MDS4927 and was issued by New York (NY), United States (US), the apparatus 20, such as the processor 22, may be configured to order or format the license plate information as US-NY-MDS4927 and to then hash the license plate information. In this regard, the hashed identifier of US-NY-MDS4927 that is generated by a plurality of different hash functions is set forth below:

| | |
|---|---|
| Adler32 | 1b6e03c4 |
| CRC32 | e7858594 |
| Haval | bfaaaf1c4b638ea5e67188b4bdd9fa94 |
| MD2 | 1ee7918632e7bef64f2feaf13b37bcff |
| MD4 | f243e61e2b6e07477272bb9fc67c0a49 |
| MD5 | 1dc43dc136cf0ad8bb28476c4dfb5029 |
| RipeMD128 | fe922e19b5a55459505e50ea443ce87e |
| RipeMD160 | 371381853321e67e6abbf2ca0c0ecc7c127762f0 |
| SHA-1 | 2a573d802dc90e8399b71ef837bca88fdb0df83e |
| SHA-256 | 07971fd6482f0c9886b869c3c206fc57259e7a55d138ec48dbe55b6ba89d56d9 |
| SHA-384 | 8373ef71e5b8970b7a25a6122aa4bef220251bd02c3d459c1717a31ea34ac8ed0d 13983fdfbac3f260141b39de9d79d0 |
| SHA-512 | 46e07b2a91b6a97bb7919e3574b25276c14a7e7453add7bfccc5fbb0964447944e 948c2aaf51d438f5d41923080247239630e0d55ead421fcf801b74d9151840 |
| Tiger | c090e0863b631939c770a3bc977a176329f5dd735e44aff1 |
| Whirlpool | 8e729483e7674332a0bd33fd7258017837158f43f698e33bb43da621da2d3ed83e 68afee113bccb5d15539170ae7bdb66e02749bea377056b1b3e140debac567 |

Although one example order or format of the license plate information is provided above, the license plate information may be ordered or formatted in accordance with any predefined order. As the foregoing example illustrates, a variety of different hash functions may be utilized to create the hashed identifier. The choice of the hash function may be premised upon various considerations including computational expense, hash size, collision avoidance (e.g., the likelihood of two different license plates generating the same hash), etc.

The apparatus 20 configured to capture and provide virtual probe data also includes means, such the processor 22 or the like, for determining the location and optionally the speed and/or heading of the vehicle that is the subject of the virtual probe point, such as vehicle 10 in the example of FIG. 1. The location of the vehicle may be determined in various manners. In an example embodiment, the location of the platform that carries the apparatus configured to capture and provide virtual probe data, such vehicle 12 or 14 in the example of FIG. 1, may include a location determination system, such as a GPS 32. Since the vehicle that is the subject of the virtual probe point is proximate the platform that carries the apparatus 20 configured to capture and provide virtual probe data, the location of the vehicle associated with the virtual probe point may be set equal to the location of the platform, such as the vehicle, that carries the apparatus configured to capture and provide the virtual probe data. Alternatively, the apparatus, such as the processor, may be configured to calculate the location of the vehicle that is the subject of the virtual probe point based upon the location of the platform, such as the vehicle, that carries the apparatus that is configured to capture and provide the virtual probe data as offset based upon a difference in location between the two vehicles. The location offset may be a predefined amount, or may be determined based upon an analysis of the image captured by the camera 30 or signals returning to a radar or LiDAR system 34 following interaction with the vehicle that is the subject of the virtual probe point. In this regard, the location of the vehicle that is the subject of the probe point may be determined based upon images captured by the camera, such as based upon triangulation in an instance in which the camera is configured to capture stereo images or based upon optical flow in an instance in which the camera captures a plurality of sequential images. Although described herein in communication with a radar or LiDAR system, the apparatus configured to capture and provide virtual probe data may communication with various types of systems, such as ultrasound systems, configured, in turn to transmit and receive signals that, upon analysis, permit vehicles in the proximity thereto to be identified.

The apparatus 20, such as the processor 22, of an example embodiment may be configured to map match the location of the vehicle that is the subject of the virtual probe point to a road as represented by a map of the region through which the vehicle is traveling prior to the transmission of the virtual probe data to a computing system, such as a routing and traffic navigation system. As such, the location of the vehicle that is included within the virtual probe data may be the physical location of the vehicle, such as the latitude and longitude of the vehicle, or the map matched location of the vehicle along a road as represented by a map.

With respect to the speed of the vehicle with which the virtual probe point is associated, the apparatus 20, such as the processor 22, may be configured to determine the speed in various manners. In an example embodiment in which the vehicle with which the virtual probe point is associated is traveling in the same direction as the vehicle that carries the apparatus configured to capture the virtual probe data, the speed of the vehicle associated with the virtual probe point may be set equal to the speed of the vehicle that carries the apparatus configured to capture the virtual probe data or may otherwise be based upon the speed of the vehicle that carries the apparatus configured to capture the virtual probe data, such as by defining the speed of the vehicle that is the subject of the virtual probe point to be offset from the speed of the vehicle that carries the apparatus configured to capture the virtual probe data based upon a speed offset therebetween that is, in turn, based upon the relative speed of the vehicle that is the subject of the virtual probe point to the vehicle that is configured to capture the virtual probe data, such as defined based upon an analysis of a sequence of images captured by the camera 30 or based upon signals returning to a radar or LiDAR system 34 following interaction with the vehicle that is the subject of the virtual probe point. Alternatively, the apparatus may be in communication with a radar or LiDAR system 34 carried by the same platform that captures information regarding the vehicle with which the virtual probe point is associated from which the speed may be determined. By way of example, a radar and/or LiDAR system may provide signals returning from interaction from the vehicle that is the subject of the virtual probe point that may be analyzed to determine the speed of the vehicle with which the virtual probe point will be associated, or at least the speed relative to the speed of the platform carrying the radar and/or LiDAR system. As yet another alternative, the camera may be configured to capture multiple sequential images of the vehicle with which the virtual probe point will be associated and the processor may be configured to analyze the plurality of sequential images in order to determine the speed of the vehicle with which the virtual probe point will be associated relative to the speed of the platform, e.g., the vehicle, that carries the apparatus configured to capture the virtual probe data.

The apparatus 20 configured to capture and provide virtual probe data in accordance with an example embodiment optionally also includes means, such as the processor 22 or the like, for determining the heading of the vehicle with which the virtual probe point is associated. The heading may be determined in various manners. In an example embodiment, however, the heading may be determined in a comparable manner to that in which the speed is determined, such as based upon an analysis of information collected by a radar and/or LiDAR system 34 and/or based upon an analysis of multiple sequential images captured by the camera 30 of the vehicle with which the virtual probe point is to be associated.

Further, the apparatus 20 of an example embodiment includes means, such as the processor 22 or the like, for determining the time at which the virtual probe data for the vehicle was collected. In this regard, the image of the vehicle with which the virtual probe point is to be associated and other information, such as information collected by the radar and/or LiDAR systems 34, are preferably obtained at the same time or at least within a predefined window of time. In this regard, the apparatus, such as the processor, is configured to identify the time at which the image of the vehicle and the other information associated with the vehicle are obtained as the time, such as the time stamp, to be associated with the virtual probe point.

In another alternative embodiment, the vehicle that is the subject of the probe point, e.g., vehicle 10 in the example embodiment of FIG. 1, and the vehicle that carries the apparatus 20 configured to capture and provide the virtual probe data, e.g., vehicles 12 and 14 in FIG. 1, may be connected vehicles, such that a communication link is established therebetween. In this embodiment, the apparatus that is configured to capture and provide the virtual probe data may collect at least some of the data elements of the virtual probe point, such as the location, speed and/or heading, from the vehicle that is the subject of the probe point via the communication link therebetween.

As shown in block 46 of FIG. 3, the apparatus 20 configured to capture and provide virtual probe data also includes means, such as the processor 22, the communication interface 26 or the like, for causing the virtual probe data including the hashed identifier and the location and optionally the speed and the heading of the vehicle and/or the time at which the virtual probe data was collected to be transmitted, such as to a computing system, e.g., a routing and navigation system, for subsequent analysis as described below. Typically, only the identifier of the vehicle has been hashed. The transmission of virtual probe data may occur concurrent or shortly following the collection of the virtual probe data, typically while the vehicle continues along its route, or may occur in a batch mode, such as upon the return of the vehicle that carries the apparatus configured to capture the virtual probe data to its home or other predefined location. The apparatus may cause the virtual probe data to be transmitted directly to a computing system for analysis, or may transmit the virtual probe data to a database, the cloud, a server or other external memory for storage prior to retrieval and analysis by the computing system.

The virtual probe data may be transmitted in various manners. In an example embodiment, however, the virtual probe data may be configured and transmitted in accordance with a predefined format, such as defined by the Vehicle Sensor Data Cloud Ingestion Interface Specification, version 2.0.2 by HERE Global B.V. (2015), the contents of which are incorporated herein by reference in their entirety. In this regard, in an instance in which the processing of the virtual probe data that is required to configure the virtual probe data into a predefined format is performed by the apparatus 20 onboard the vehicle, a new object may be defined that includes various fields including hashed identifier, location, e.g., latitude and longitude, and timestamp, and optionally speed and heading. Alternatively, in an instance in which the processing of the virtual probe data that is required to configure the virtual probe data into a predefined format is performed offboard the vehicle that captures the virtual probe data, such as following transmission of the virtual probe data, object detection as defined by Section 2.4.8 of the foregoing Specification may be utilized to create the virtual probe point based on the latitude, longitude, heading and speed information provided by the apparatus. In an example embodiment, the predefined format of the virtual probe data may also include fields for accuracy, such as horizontal accuracy, heading accuracy and speed accuracy as described by Sections 2.5.6, 2.5.11 and 2.5.12 of the Specification, respectively.

The apparatus 20 described above with respect to FIGS. 2 and 3 and configured to capture virtual probe data serves as a source of virtual probe data for the computing system, such as routing and navigation system 50 as shown in FIG. 4. In this regard, a plurality of sources 52 of virtual probe data may communicate with a computing system, such as a routing and navigation system, in order to provide virtual probe data consisting of one or more virtual probe points to the routing and navigation system. The routing and navigation system may, in turn, store the virtual probe data, including the virtual probe points and the hashed identifiers associated therewith, in a probe data repository 54. The probe data repository may store both the virtual probe data as well as more traditional probe data. Although shown in FIG. 4 and described herein in the context of the plurality of sources directly communicating with the computing system, either all or some of the sources may, instead, transmit the virtual probe data to a database, the cloud, a server or other external memory for storage prior to retrieval and analysis by the computing system. In yet another alternative embodiment, the plurality of sources may provide the virtual probe data to one or more edge servers or other distributed computing devices for at least partially analyzing the virtual probe data prior to providing the analyzed probe data to a more central computing system, such as a routing and navigations system.

As described above with respect to the apparatus 20 of FIG. 2, the source 52 of the virtual probe data may be a vehicle configured to capture traditional probe points indicative of the travel of the vehicle itself and, in accordance in an example embodiment of the present invention, may now be further configured to capture virtual probe points related to other vehicles located, at least temporarily, in their proximity, such as by being visible from the vehicle such that an image of an identifier, e.g., license plate information, may be captured. Since each source may be in the vicinity of many other vehicles over the course of time, such as while a vehicle carrying the apparatus configured to capture and provide virtual probe data, travels along a route, a relatively small number of sources may capture a large number of virtual probe points associated with many different vehicles. By analyzing the virtual probe points, along with the traditional probe points in some instances, provided by the plurality of sources, both the number and the density of the probe points (both traditional and virtual probe points) is increased, thereby enhancing the driving navigation functionality including, for example, an increase in the precision in the estimation of traffic conditions and/or the detection of changes in the road, particularly for roads that are less traveled. By way of example, roads may be distinguished based upon road type, such as freeways for roads that can only be intersected by on/off ramps and connected to primary routes as described below, primary routes between major and smaller cities and through metropolitan areas, major routes between minor cities and towns and through city districts, minor routes that connect minor towns or villages, collector streets that collect local traffic in city districts and local streets that are not efficient through routes. As such, while the method and apparatus of an example embodiment may be useful for all road types, the advantages may be particularly beneficial for major routes, minor routes, collector streets and local streets that are less well traveled and, as such, may not be represented by as many traditional probe points.

Although the computing system is embodied by a routing and traffic navigation system 50 as shown in FIG. 4, the computing system may be embodied a variety of computing devices including, for example, a server, a plurality of networked computing devices, a computer workstation, a personal computer, a laptop computer, ADAS, a GPS or the like, that are configured to analyze probe points including virtual probe points. In an embodiment in which the computing system is embodied by a computing device, such as a server, that is distinct from a navigation system, an ADAS, a GPS or the like, the computing system may advantageously be in communication with user device, such as a navigation system, an ADAS, a GPS, a personal navigation device (PND), a portable navigation device or other personal computing device, such as a mobile telephone, a tablet computer or the like, in order to provide routing and navigation information based at least in part upon the virtual probe points to a user.

Regardless of the manner in which the computing system is embodied, the computing system of an example embodiment includes, is associated with or is in communication with an apparatus 60 configured to analyze the virtual probe data (and also generally the traditional probe data), such as shown in FIG. 5 in accordance with an embodiment of the present invention. The apparatus configured to analyze the virtual probe data in accordance with this example embodiment includes, is associated with or otherwise be in communication with a processor 62, a memory device 64, a communication interface 66 and optionally a user interface 68. From a component perspective, the processor, the memory device, the communication interface and the user interface may be embodied as described above in conjunction with comparable components of the apparatus 20 configured to capture and provide virtual probe data as shown in FIG. 2.

Referring now to FIG. 6, the operations performed, such by the apparatus 6o of FIG. 5 in accordance with an example embodiment in order to estimate traffic conditions or detect a change in the road based upon virtual probe data are depicted. As shown in block 70 of FIG. 6, the apparatus 60 configured to analyze virtual probe data in accordance with an example embodiment includes means, such as the processor 62, the communication interface 66 or the like, for receiving virtual probe data (and, in some embodiments, traditional probe data also) from a plurality of sources 52. The virtual probe data includes a plurality of virtual probe points at different respective locations, the capture of which has been described above in conjunction with FIGS. 2 and 3. For a virtual probe point, the virtual probe data includes a hashed identifier of a vehicle, such as the hashed representation of the license plate information of the vehicle. The virtual probe data also generally includes the location of the vehicle although the location of the vehicle need not be hashed. As described above, the location of the vehicle may be determined to be either 1) a location of the source corresponding to the virtual data point, or 2) a location calculated by the source so as to include a location offset based on a relative location of the vehicle to the source corresponding to the virtual data point, In embodiments in which the location of the vehicle that is provided by the virtual probe data has not been map matched by the apparatus 20, such as the processor 22, that captured and provided the virtual probe data, the apparatus, such as the processor, of an example embodiment may be configured to map match the location of the vehicle to a respective road as represented by a map of the region through which the vehicle is traveling. As such, the location of the vehicle that is included within the virtual probe data may be the physical location of the vehicle, such as the latitude and longitude of the vehicle, and/or may be the map matched location of the vehicle along a road as represented by a map. As described above, a virtual probe point may also include optionally include additional parameters associated with the vehicle, e.g., vehicle 10 in the embodiment of FIG. 1, and, in some example embodiments, includes the speed of the vehicle, the heading of the vehicle and/or the time at which the virtual probe data for the vehicle was collected, such as in the form of a timestamp as shown in FIG. 1.

In an example embodiment, the hashed identifiers of the vehicles that are the subject of a plurality of virtual probe points have been subjected to the same hash function by each of the plurality of sources 52 of the virtual probe points. In other words, each source transforms the identifiers of the vehicles that are the subject of the virtual probe points provided by the source in accordance with the same hash function. As such, while the identifier of the vehicle may be subjected to a variety of hash functions, such as a one-way hash function, e.g., SHA-1, each of the sources provides the virtual probe data with the identifiers of the vehicles having been hashed in accordance with the same hash function, such as the same one-way hash function. By utilizing the same hash function to create the hashed identifiers of the vehicles regardless of the source of the virtual probe data, the apparatus, such as the processor, of FIG. 5 can identify multiple probe points associated with the same vehicle at different locations at different times and, in some instances, reported by different sources.

The apparatus 60 also includes means, such as the processor 62, the memory 64 or the like, for updating the probe data repository 54 with the virtual probe data. As such, the probe data repository is updated with virtual probe data including the plurality of virtual probe points and the hashed identifiers associated therewith. The probe data repository may also store traditional probe points so as to maintain a complete collection of probe points, both virtual and traditional. Although the probe data repository may be implemented in various manners, the probe data repository of an example embodiment may be embodied by the memory 64. Alternatively, the probe data repository may be an external memory accessible to the apparatus 60, such as a server, a database, the cloud or the like.

Once the probe data repository 54 has been updated, the apparatus 60 may perform various routing and navigation functions utilizing the virtual probe data and, more typically, both the virtual and traditional probe data. Examples of routing and navigation functions include the estimation of traffic conditions as shown in blocks 72 and 74 of FIG. 6, the detection of a change in a road as shown in block 76 and the estimation of traffic conditions at a particular location as shown in block 78. However, these routing and navigation functions are shown by way of example and other routing and navigation functions may be performed based at least in part upon the virtual probe data in addition to or instead of those depicted in FIG. 6. Additionally, although shown in parallel in FIG. 6, the three different routing and navigation functions of FIG. 6 may each be performed, either in parallel or sequentially, or only one or any combination of two of the illustrated routing and navigation functions may be performed.

As shown in block 72 of FIG. 6, however, the apparatus 60 of an example embodiment also includes means, such as the processor 62 or the like, for analyzing the hashed identifiers of the virtual probe points provided by different sources 52 to identify the same vehicle at different locations at different times. In this regard, the use of the same hash function with respect to the hashed identifiers of virtual probe points provided by a variety of sources permits the hashed identifier of the same vehicle both to be the same regardless of the source of the virtual probe data and to be unique relative to the hashed identifiers of the other vehicles rather than the subject of the other virtual probe data. By way of example and in reference to FIG. 1, two different virtual probe points associated with vehicle 10 are captured by two different sources, namely, vehicle 12 and vehicle 14. In this regard, at time t=i, vehicle 12 captures a virtual code point associated with vehicle 10, and creates a hashed identifier of the license plate information of vehicle 10 and at a later time, namely, time t=i+1, vehicle 14 captures a virtual probe point that is also associated with vehicle 10 and creates a hashed identifier of the license plate information of vehicle 10. Since the apparatuses 20 onboard vehicles 12 and 14 for capturing virtual probe data utilize the same hash function, the hashed identifier of the license information of vehicle 10 is the same for both virtual probe points captured by different sources. Thus, the apparatus, such as the processor, is configured to identify the same vehicle at different locations at different times by identifying virtual probe points having the same hashed identifier, which consistently and uniquely identifies a respective vehicle.

As shown in block 74 of FIG. 6 and based upon the identification of the same vehicle at different locations at different times, the apparatus 60 configured to analyze the virtual probe data further includes means, such as the processor 62 or the like, for estimating traffic conditions. Additionally, the apparatus, such as the processor, may be configured to determine the travel time between the different locations at which the same vehicle was identified, such as based upon a difference in the times at which the virtual probe points were captured. The apparatus, such as the processor, may be configured to estimate traffic conditions based upon the combination of probe points, that is, traditional probe points captured by data collection devices carried by the same vehicles that are the subject of the virtual probe points, and virtual probe points, thereby creating a larger cloud of probe points and increasing the penetration and density of probe points, collectively, on the roads. By having an increased density in regards to the probe points, the apparatus, such as the processor, is configured to perform various routing and traffic navigation functions, including the estimation of traffic conditions, with more precision and reliability, particularly with respect to roads that are less frequently traveled, such as residential roads.

In relation to the estimation of travel conditions, the apparatus 60 of an example embodiment includes means, such as the processor 62 or the like, for determining a most likely route between the different locations at which the same vehicle was identified at different times based upon an analysis of the virtual probe data. The apparatus of this embodiment also includes means, such as the processor or the like, for estimating the distance traveled by the vehicle along the most likely route between the different locations and/or means, such as the processor, for determining an average speed of the vehicle along the most likely route between the different locations. In relation to the example of FIG. 1, the apparatus, such as the processor, may determine that the most likely route between the location of vehicle 10 at time t=I and the location of vehicle 10 at time t=i+1 is along Westborough Boulevard. As such, the apparatus, such as the processor, may, in this example, determine the distance traveled by vehicle 10 along Westborough Boulevard between the two different locations and/or the average speed of the vehicle along the most likely route between the two different locations on Westborough Boulevard. Utilizing this information, the apparatus, such as the processor, may be configured to determine, typically in combination with the analysis of a number of other probe points along Westborough Boulevard as to whether the traffic flowing along Westborough Boulevard is freely flowing, is lightly congested or is heavily congested as well as the rate of travel of vehicles along Westborough Boulevard. A routing and navigation system 52 may then utilize this information to define routes for other vehicles, to estimate travel times for other vehicles and to generally provide routing and navigation services.

With respect to the detection of a change in a road, the apparatus 60 of an example embodiment includes means, such as the processor 62 or the like, for detecting a change in a road based at least in part upon the virtual probe data (or a combination of the virtual probe data and the traditional probe data) having a location associated with the road. See block 76 of FIG. 6. In this regard, the apparatus, such as the processor, is configured to identify probe points, including virtual probe points, that are indicative of the travel of a vehicle along the route that deviates from the roads that are included in a map of the region. In this regard and typically in instances in which the apparatus, such as the processor, detects multiple probe points, such as multiple virtual probe points, travelling around the same route that differs from the known roads in the region, the apparatus, such as the processor, may be configured to detect that an existing road has been modified, such as due to construction, or a new road has been built and opened. Thus, a routing and navigation system 52 may update a map based upon this information and routing and navigation services may be provided while taking into account the change in the road.

Additionally or alternatively, apparatus 60 of an example embodiment includes means, such as the processor 62 or the like, for estimating traffic conditions in a location based at least in part upon the virtual probe data associated with the location. See block 78 of FIG. 6. As such, the apparatus, such as the processor, of this example embodiment can evaluate the probe points, such as both the virtual probe points and the traditional probe points, associated with a particular location, such as a link of a road, and determine the traffic conditions for that location, such as whether traffic is free flowing, slightly congested or heavily congested.

As described above, a method, apparatus and computer program product are provided in accordance with an example embodiment in order to utilize virtual probe points, such as in combination with traditional probe points, for various routing and navigation purposes. By supplementing the traditional probe data with virtual probe data that includes a plurality of virtual probe points, a larger number of probe points may be collected and a greater penetration rate may be obtained. Thus, routing and navigation systems 52 may utilize the virtual probe data to estimate traffic conditions more precisely and to detect changes in a road including the construction of a new road, even in instances in which the road is less traveled as a result of the increase in the number of relevant probe points brought about by the reliance on virtual probe points. Further, the increased penetration rate brought about by the reliance upon virtual probe points may permit traffic flow to be estimated as a combination of traditional probe points and virtual probe points may include all or a substantial fraction of the vehicles travelling along a road so as to permit the traffic density and the traffic flow along the road to be more reliably estimated.

FIGS. 3 and 6 illustrate flowcharts of an apparatus, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A navigation system comprising at least one processor and at least one memory including computer program instructions, the at least one memory and the computer program instructions, with the at least one processor, causing the navigation system at least to:
   receive virtual probe data from a plurality of sources, wherein the virtual probe data comprises a plurality of virtual probe points at different respective locations, wherein, for a virtual probe point, the virtual probe data comprises a hashed identifier of a vehicle and a location of the vehicle, wherein the hashed identifiers of the virtual probe data that is received have been subjected to a same hash function by each of the plurality of sources, and wherein the plurality of sources comprise a plurality of data collection devices carried by vehicles that are different than the vehicle to which the virtual probe data relates; and
   analyze the hashed identifiers of the virtual probe points provided by different sources to identify a same vehicle at different locations at different times and, based on identification of the same vehicle at different locations at different times, to estimate traffic conditions.

2. A navigation system according to claim 1 wherein the at least one memory and the computer program instructions, with the at least one processor, are further configured to cause the navigation system to:
   store the virtual probe data including the plurality of virtual probe points and the hashed identifiers associated therewith.

3. A navigation system according to claim 1 wherein the at least one memory and the computer program instructions, with the at least one processor, are further configured to cause the apparatus to:

estimate traffic conditions by determining a most likely route between the different locations and estimating a distance traveled by the vehicle along the most likely route between the different locations or determining an average speed of the vehicle along the most likely route between the different locations.

4. A method comprising:

receiving virtual probe data from a plurality of sources, wherein the virtual probe data comprises a plurality of virtual probe points at different respective locations, wherein, for a virtual probe point, the virtual probe data comprises a hashed identifier of a vehicle and a location of the vehicle, wherein the hashed identifiers of the virtual probe data that is received have been subjected to a same hash function by each of the plurality of sources, and wherein the plurality of sources comprise a plurality of data collection devices carried by vehicles that are different than the vehicle to which the virtual probe data relates; and updating a probe data repository with the virtual probe data including the plurality of virtual probe points and the hashed identifiers associated therewith.

5. A method according to claim 4 further comprising analyzing the hashed identifiers of the virtual probe points provided by different sources to identify a same vehicle at different locations at different times; and based on identification of the same vehicle at different locations at different times, estimating traffic conditions.

6. A method according to claim 5 wherein estimating traffic conditions comprises determining a most likely route between the different locations and estimating a distance traveled by the vehicle along the most likely route between the different locations or determining an average speed of the vehicle along the most likely route between the different locations.

7. A method according to claim 4 further comprising detecting a change in a road based at least in part upon the virtual probe data having a location associated with the road.

8. A method according to claim 4 further comprising estimating traffic conditions in a location based at least in part upon the virtual probe data associated with the location.

9. A method according to claim 4 wherein receiving the virtual probe data comprises receiving virtual probe data that further comprises a speed of the vehicle.

10. A method according to claim 9 wherein the speed of the vehicle is determined to be either 1) a speed of the source corresponding to the virtual data point, or 2) a speed calculated by the source corresponding to the virtual data point, the speed calculated by the source including a speed offset based on a relative speed of the vehicle to the source corresponding to the virtual data point.

11. A method according to claim 4 wherein receiving the virtual probe data comprises receiving virtual probe data that further comprises a heading of the vehicle.

12. A method according to claim 4 wherein the location of the vehicle is determined to be either 1) a location of the source corresponding to the virtual data point, or 2) a location calculated by the source corresponding to the virtual data point, the location calculated by the source including a location offset based on a relative location of the vehicle to the source corresponding to the virtual data point.

13. A method according to claim 4 wherein the hashed identifier comprises a hashed representation of license plate information of the vehicle.

14. A method according to claim 4 wherein the hash function comprises a one-way hash function.

15. An apparatus comprising at least one processor and at least one memory including computer program instructions, the at least one memory and the computer program instructions, with the at least one processor, causing the apparatus at least to:

receive virtual probe data from a plurality of sources, wherein the virtual probe data comprises a plurality of virtual probe points at different respective locations, wherein, for a virtual probe point, the virtual probe data comprises a hashed identifier of a vehicle and a location of the vehicle, wherein the hashed identifiers of the virtual probe data that is received have been subjected to a same hash function by each of the plurality of sources, and wherein the plurality of sources comprise a plurality of data collection devices carried by vehicles that are different than the vehicle to which the virtual probe data relates; and update a probe data repository with the virtual probe data including the plurality of virtual probe points and the hashed identifiers associated therewith.

16. An apparatus according to claim 15 wherein the at least one memory and the computer program instructions, with the at least one processor, are further configured to cause the apparatus to:

analyze the hashed identifiers of the virtual probe points provided by different sources to identify a same vehicle at different locations at different times; and based on identification of the same vehicle at different locations at different times, estimate traffic conditions.

17. An apparatus according to claim 15 wherein the at least one memory and the computer program instructions, with the at least one processor, are further configured to detect a change in a road based at least in part upon the virtual probe data having a location associated with the road.

18. An apparatus according to claim 15 wherein the at least one memory and the computer program instructions, with the at least one processor, are further configured to estimate traffic conditions at a location based at least in part upon the virtual probe data associated with the location.

19. An apparatus according to claim 15 wherein the at least one memory and the computer program instructions are configured, with the at least one processor, to cause the apparatus to receive the virtual probe data by receiving virtual probe data that further comprises at least one of a speed or a heading of the vehicle.

20. An apparatus according to claim 15 wherein the hashed identifier comprises a hashed representation of license plate information of the vehicle.

21. An apparatus comprising at least one processor and at least one memory including computer program instructions, the at least one memory and the computer program instructions, with the at least one processor, causing the apparatus at least to:

receive an image captured by a camera of an identifier of a vehicle, wherein the camera is carried by a platform different than the vehicle, and wherein the platform comprises a vehicle different than the vehicle having the identifier that is a subject of the image;

subject the identifier of the vehicle to a hash function to create a hashed identifier;

determine a location of the vehicle having the identifier that is the subject of the image; and cause virtual probe data comprising the hashed identifier and the location to be transmitted for subsequent analysis.

22. An apparatus according to claim 21 wherein the at least one memory and the computer program instructions are further configured, with the at least one processor, to cause the apparatus to determine a speed of the vehicle, and wherein the virtual probe data further comprises the speed.

23. An apparatus according to claim 22 wherein the at least one memory and the computer program instructions are configured, with the at least one processor, to cause the apparatus to determine the speed of the vehicle either by 1) determining a speed of the platform, or 2) calculating the speed by including a speed offset based on a relative speed of the vehicle to the platform.

24. An apparatus according to claim 21 wherein the at least one memory and the computer program instructions are further configured, with the at least one processor, to cause the apparatus to determine a heading of the vehicle, and wherein the virtual probe data further comprises the heading.

25. An apparatus according to claim 21 the at least one memory and the computer program instructions are configured, with the at least one processor, to cause the apparatus to determine the location of the vehicle either by 1) a location of the platform, or 2) calculating the location including a location offset based on a relative location of the vehicle to the platform.

26. An apparatus according to claim 21 wherein the at least one memory and the computer program instructions are further configured, with the at least one processor, to cause the apparatus to receive images captured by the camera of the identifiers of a plurality of vehicles and to subject the identifiers of the plurality of vehicles to the same hash function to create a plurality of hashed identifiers.

27. An apparatus according to claim 26 wherein the images captured by the camera include the identifiers of vehicles traveling in both a same and a different direction as the platform upon which the camera is carried.

28. An apparatus according to claim 21 wherein the camera is configured to capture images for one or more safety features of the vehicle.

29. An apparatus according to claim 21 wherein the identifier of the vehicle comprises license plate information of the vehicle.

* * * * *